United States Patent [19]
Ahmed

[11] Patent Number: 6,145,751
[45] Date of Patent: Nov. 14, 2000

[54] METHOD AND APPARATUS FOR DETERMINING A THERMAL SETPOINT IN A HVAC SYSTEM

[75] Inventor: Osman Ahmed, Buffalo Grove, Ill.

[73] Assignee: Siemens Building Technologies, Inc., Buffalo Grove, Ill.

[21] Appl. No.: 09/228,428

[22] Filed: Jan. 12, 1999

[51] Int. Cl.[7] .............................. G05D 23/00; G01K 3/00
[52] U.S. Cl. ......................... 236/51; 236/78 B; 165/208; 374/115
[58] Field of Search .................................. 236/51, 78 B; 165/208, 209, 254; 374/115

[56] References Cited

U.S. PATENT DOCUMENTS

| | | | |
|---|---|---|---|
| 5,170,935 | 12/1992 | Federspiel et al. | 236/44 C |
| 5,285,959 | 2/1994 | Nanba et al. | 236/11 |
| 5,301,101 | 4/1994 | MacArthur et al. | 364/156 |
| 5,333,953 | 8/1994 | Kon | 374/109 |
| 5,436,852 | 7/1995 | Kon | 374/109 X |
| 5,560,711 | 10/1996 | Bu | 374/109 |
| 5,570,838 | 11/1996 | Davis, Jr. et al. | 236/49.3 |
| 5,572,195 | 11/1996 | Heller et al. | 340/825.35 |
| 5,579,993 | 12/1996 | Ahmed et al. | 236/49.3 |
| 5,737,934 | 4/1998 | Shah | 62/176.6 |
| 5,762,265 | 6/1998 | Kitamura et al. | 165/208 X |
| 5,822,740 | 10/1998 | Haissig et al. | |

OTHER PUBLICATIONS

Berglund, L., "Mathematical Models for Predicting The Thermal Comfort Response of Building Occupants," ASHRAE Transaction, 1978, part 1.

Charles, C., B.C. Krafthefer, M.L. Rhodes and M.A. Listvan., "Silicon Infrared Sensors for Thermal Comfort and Control," ASHRAE Journal, Apr., 1993.

Fanger, P.O., "Calculation of Thermal Comfort; Introduction of a Basic Comfort Equation," ASHRAE Transaction, 1967.

Fountain, M.E., and E.A. Arens., "Air Thermal Sensation Prediction Tool for Use by the Profession," ASHRAE Transaction, 1997, vol. 103, Part 2.

Fountain, M.E., and C. Huizenga., "A Thermal Sensation Prediction Tool for Use by the Profession," ASHRAE Transaction, 1997, vol. 103, Part 2.

McArthur, J.W., "Humidity and Predicted–Mean–Vote–Based (PMV–based) Comfort Control," ASHRAE Transaction, 1986.

Yamatake–Honeywell, "Integrated Environmental Comfort Control," Yamatake Web page, 1998.

ASHRAE Fundamentals Handbook "Thermal Comfort" 1997.

Newsham, G.R., and Tiller, D.K. "A Field Study of Office Thermal Comfort Using Questionnaire Software".

Scholten, A. "Fuzzy Logic Control" Engineered systems, Jun. 1995.

Zadeh, L.A. "The Calculus of Fuzzy If/Then Rules" A1 Expert, Mar. 1992.

Cox, Earl "Fuzzy Fundamentals" IEEE Spectrum Oct. 1992.

Y.F. Li and c.C. Lau "Development of Fuzzy Algorithms for Servo Systems" IEEE Control Systems Magazine, Apr. 1989.

Jones, Jones W. and Ogawa, Y. "Transient Interaction Between the Human and the Thermal Environment" ASHRAE Transactions Research.

Scheatzle, D.G. and Arch. D. "The Development of PMV–Based Control for a Resident in a Hot Arid Climate" ASHRAE.

(List continued on next page.)

*Primary Examiner*—William Wayner
*Attorney, Agent, or Firm*—Greer, Burns & Crain, Ltd.

[57] ABSTRACT

The present invention discloses methods for determining setpoint information in a HVAC system. Setpoint values are determined using occupant feedback provided by individual occupants over at least one of an Internet or Intranet communications network. According to a first aspect of the invention a setpoint is determined using fuzzy logic. According to a second aspect, historical setpoint data determined using occupant feedback is used to develop a neural network for predicting setpoint values.

17 Claims, 13 Drawing Sheets

OTHER PUBLICATIONS

Chan, W.T. Daniel, Burnett, John, de Dear, J. Richard Ng, Stephen C.H. "A Large–Scale Survey of Thermal Comfort in Office Premises in Hong Kong" ASHRAE.

Bauman, Fred s., Carter, Thomas G., Baughman, Anne V., Arens, Edward A. "Field Study of the Impact of a Desktop Task/Ambient Conditioning System in Office Buildings" ASHRAE.

Malama, Albert, Sharples, Steve, Pitts, Adrian, Jitkajornwanich, Kitchai "An Investigation of the Thermal Comfort Adaptive Model in a Tropical Upland Climate" ASHRAE.

Jitkhjorwanich, Kitchai, Pitts, Adrian C. Malama, Albert, Sharples, Steve Thermal Comfort in Transitional Spaces in the Cool Season of Bangkok ASHRAE.

Vaneck, T.W. "Fuzzy Guidance Controller for an Autonomous Boat" IEEE 1997.

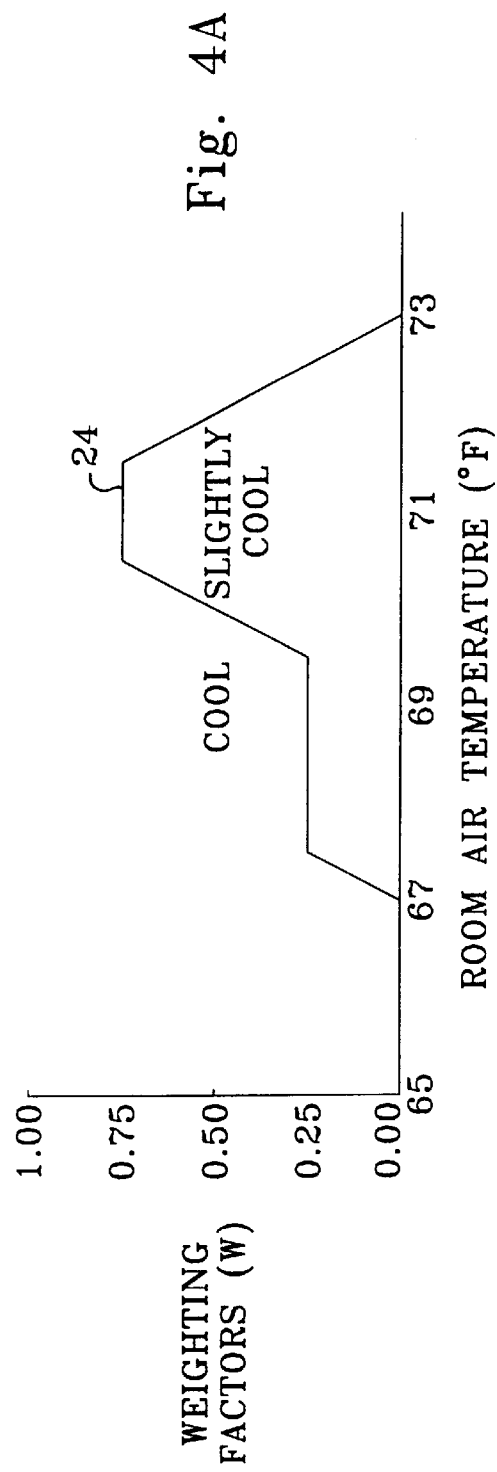
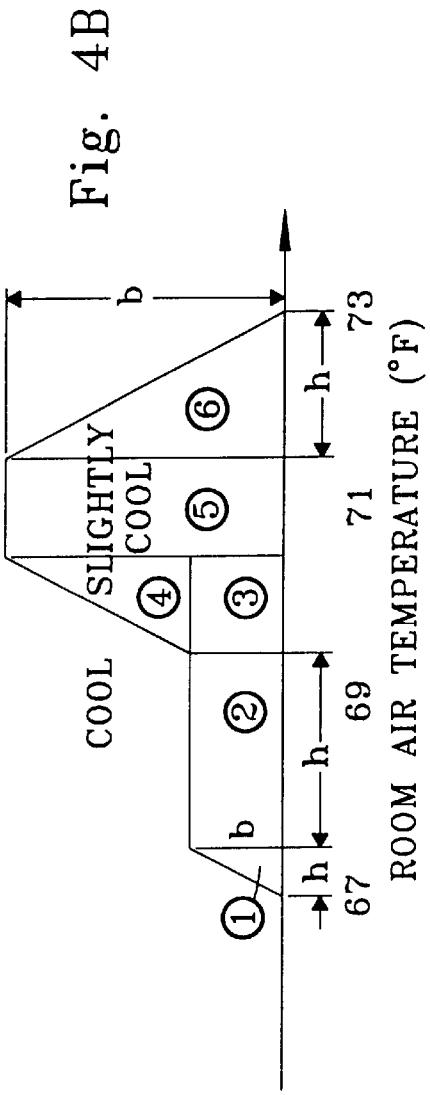

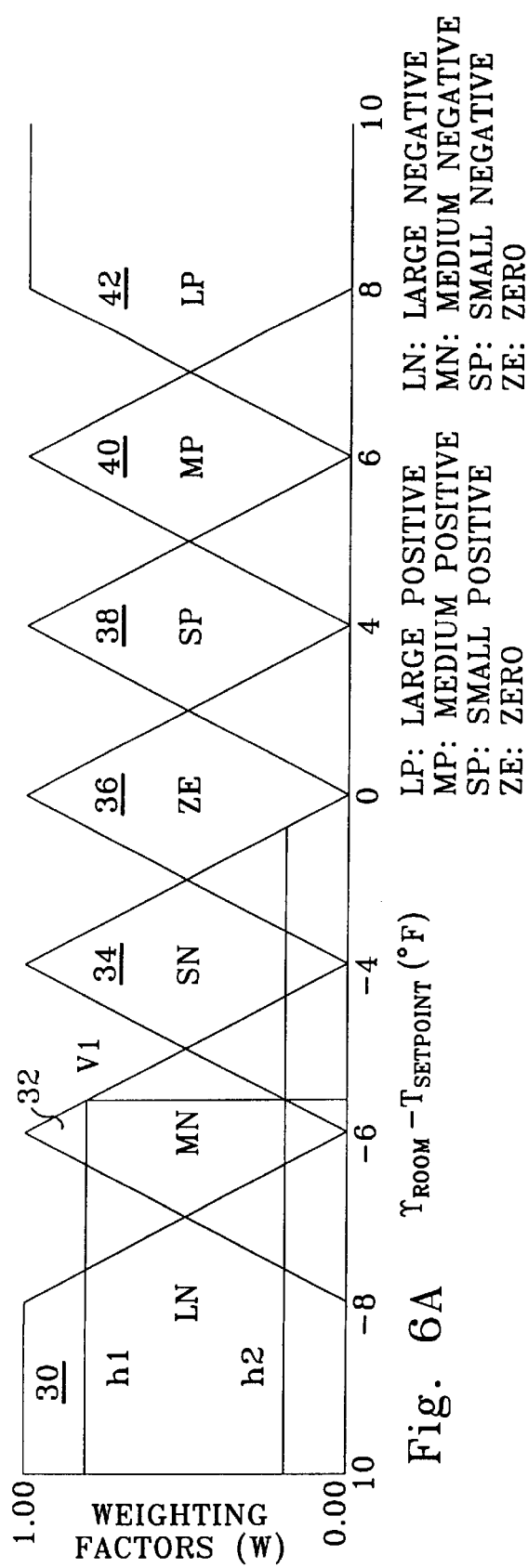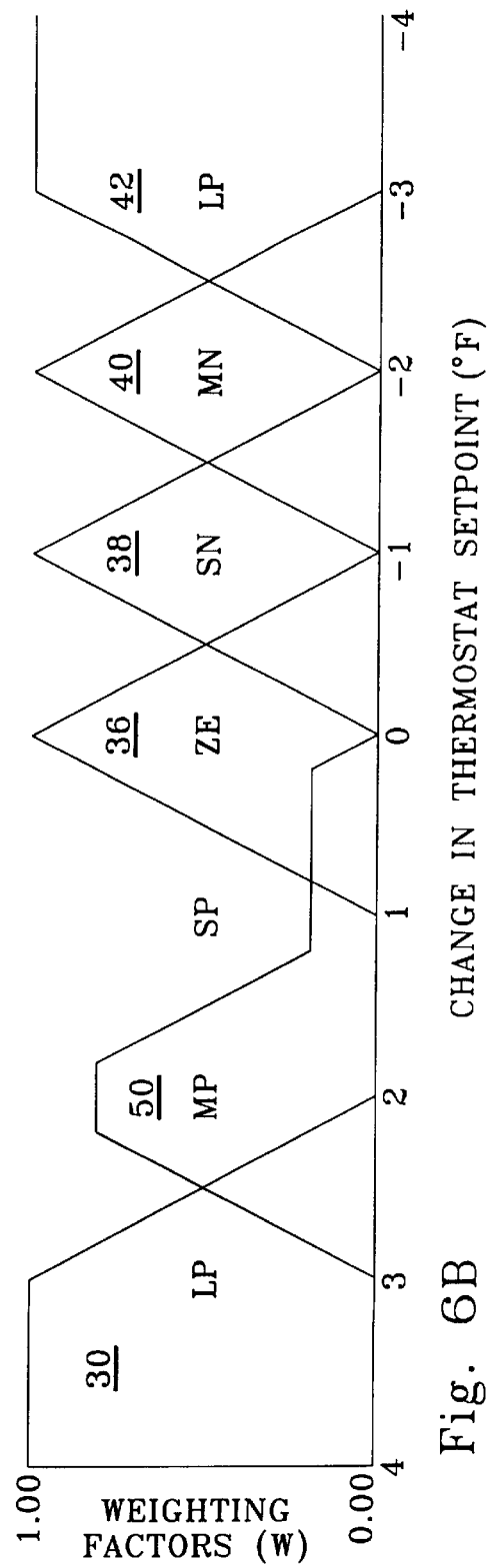
Fig. 6A
Fig. 6B

METHOD AND APPARATUS FOR DETERMINING A THERMAL SETPOINT IN A HVAC SYSTEM

FIELD OF THE INVENTION

The present invention relates generally to the field of HVAC (heating, ventilating, and air-conditioning) systems. In particular the present invention discloses an improved method for updating a thermal setpoint in HVAC system. According to a first aspect of the present invention, occupant feedback is used in determining the setpoint for a thermostat or a PMV sensor. Moreover, according to a second aspect of the present invention, a setpoint is predicted using an adaptation algorithm developed using historical data.

BACKGROUND

The primary function of a HVAC system is to provide thermal comfort for building occupants. Paradoxically, conventional HVAC control systems do not solicit feedback from more than one building occupant. Typically, a single thermostat or a temperature sensor is the only feedback mechanism for determining thermal comfort for a given heating zone. Moreover, the thermostat or temperature sensor may be influenced by the micro-climate around it and thus may not always reflect the human sense of comfort. In such a system, the location of the thermostat becomes extremely important in correlating the thermostat sensed temperature with the actual room air temperature. The human level of comfort has a strong correlation with the room air temperature as demonstrated by early research (Fountain, M. E., and C. Huizenga., "A Thermal Sensation Prediction Tool for Use by the Profession," *ASHRAE Transaction*, 1997, Vol. 103, Part 2). See, e.g., FIG. 1.

On any given day the thermostat setpoint may need adjustment depending on prevailing outdoor and indoor load conditions. For example, a mild day may require less heating whereas an unseasonably warm day may require lowering of the thermal setpoint to provide additional cooling.

Building occupants can react to the changing environment by adjusting the thermostat setpoint. However, in most large buildings a single thermostat serves an area or zone occupied by multiple occupants. Hence, it is impractical to change the thermostat setpoint manually based on the comfort level of each individual occupant. Moreover, occupant access to the thermostat is often restricted to prevent abuse. The end result is that in an existing building control system, the building occupants have limited opportunities to provide feedback.

In response to these problems, one object of the present invention is to provide an improved mechanism for determining a thermal setpoint using feedback from multiple occupants of a given heating/cooling area.

More particularly, an object of the present invention is to provide an improved HVAC system wherein many occupants may be provided with an interface for communicating thermal comfort feedback.

Another object of the present invention is to utilize an existing communications network such as Internet or Intranet to carry the feedback information to the HVAC controller in the improved system.

Another object of the present invention is to collect setpoint data, determined using occupant feedback, for subsequent use in an adaptive setpoint model for predicting a setpoint in the improved system.

Yet another object of the present invention is to provide a predicted setpoint using a neural network and historical setpoint data in the improved system.

These and other objects of the present invention are discussed or will be apparent from the following detailed description of the invention, while referring to the attached drawings.

SUMMARY OF THE INVENTION

The ability for individual occupants to provide direct feedback to the building control system would be extremely beneficial in providing thermal comfort. According to one aspect of the present invention, an existing Intranet and/or Internet communications network is used to convey thermal comfort feedback from individual occupants to the HVAC system. Notably, the present invention provides a practical method for any number of occupants to provide thermal comfort feedback to the HVAC system.

Moreover, since the perception of comfort is subjective, it lends itself to being expressed in terms of fuzzy expression (i.e., too warm or cold). Fuzzy set theory can therefore be utilized to convert the occupant feedback (fuzzy, subjective input) into a crisp output used by the building control system in updating the thermostat setpoint.

DESCRIPTIONS OF THE DRAWINGS

FIGS. 4A and 4B show a truncated view of the intersection of FIG. 3;

FIGS. 6A and 6B are fuzzy sets used to determine the new thermal setpoint according to a first embodiment;

DESCRIPTION OF THE PREFERRED EMBODIMENT

The relationship between fuzzy expression of human comfort and actual room air temperature is well established. See, e.g. Fountain, M. E., and C. Huizenga., "A Thermal Sensation Prediction Tool for Use by the Profession," *ASHRAE Transaction*, 1997, Vol. 103, Part 2, and Berglund, L., "Mathematical Models for Predicting the Thermal Comfort Response of Building Occupants," *ASHRAE Transaction*, 1978, Part 1. A fuzzy set demonstrating such a relationship is shown in FIG. 2.

Figure 1:
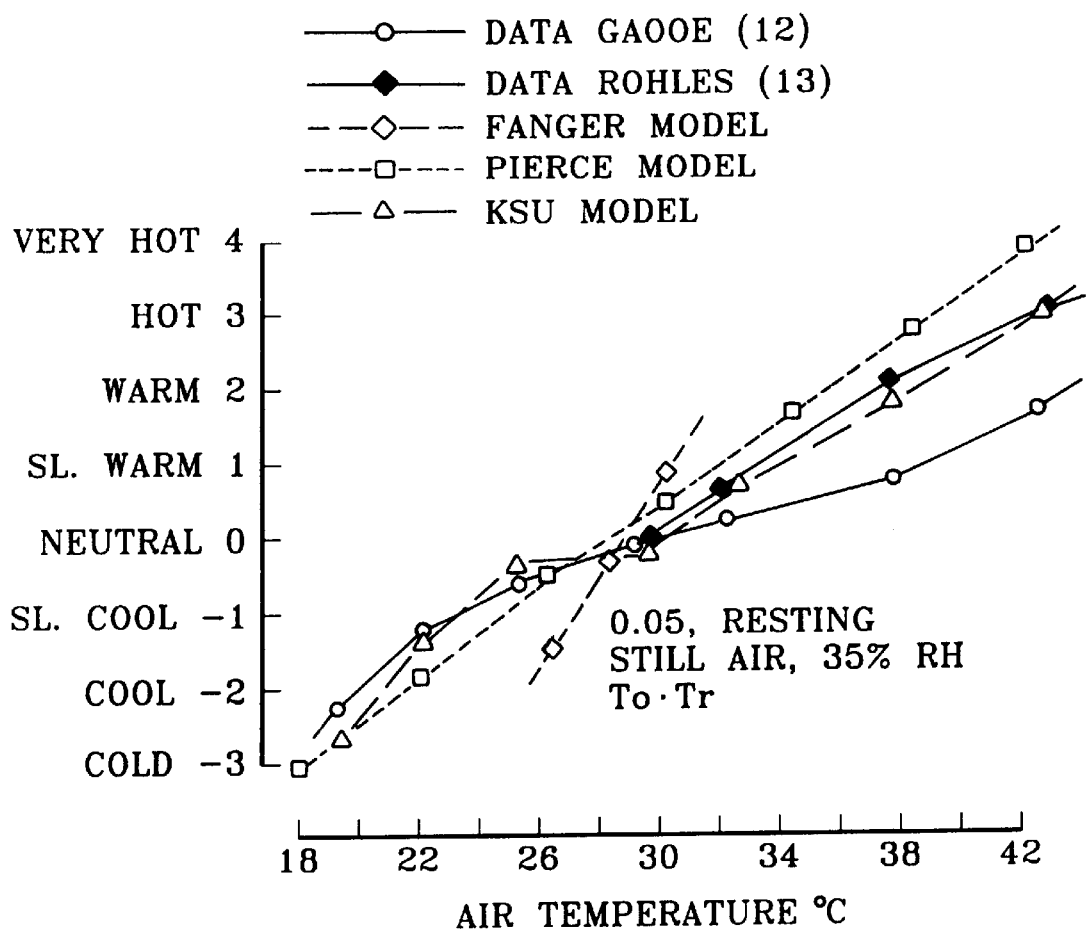
FIG. 1 is a graph showing human level of comfort in relation to room air temperature.
Figure 2:
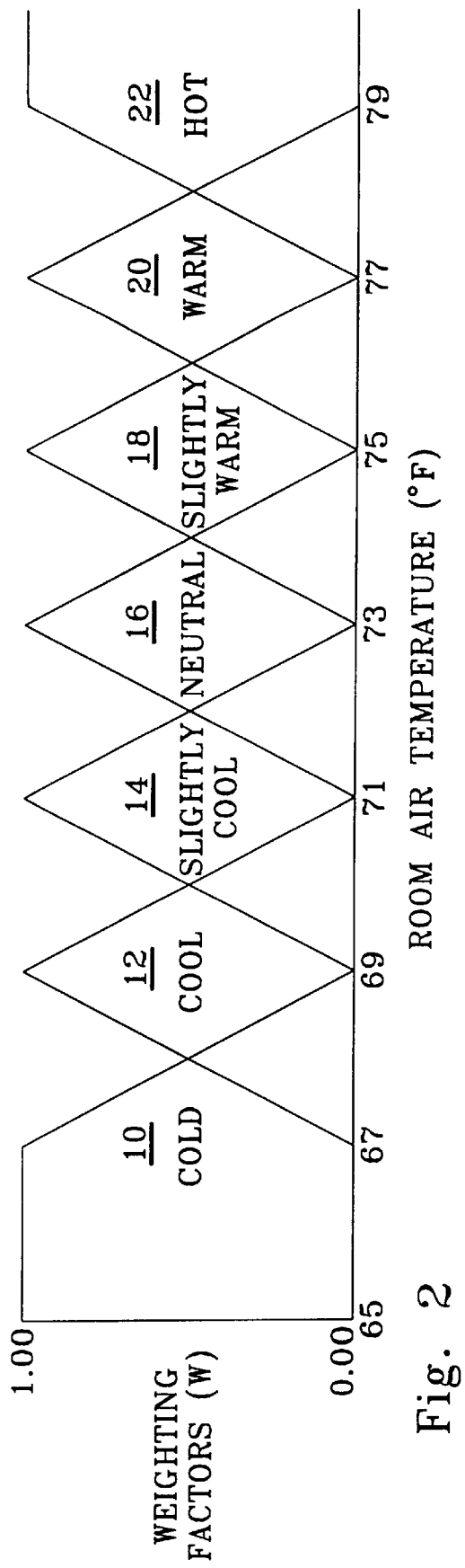
FIG. 2 shows fuzzy sets used to calculate room air temperature according to the present invention.

The subjective occupant expression of thermal comfort is represented in FIG. 2 as a collection of fuzzy sets (i.e., cold 10, cool 12, slightly cool 14, neutral 16, slightly warm 18, warm 20, and hot 22). Moreover, a value of a temperature may have a zero membership (weighting factor of 0), a full membership (weighting factor of 1) or a partial membership (weighting factor between 0 and 1). A temperature may simultaneously belong to two adjacent sets. As shown in FIG. 2, a temperature of seventy degrees falls within the intersection of the cool set 12 and the slightly cool set 14.

Figure 3:
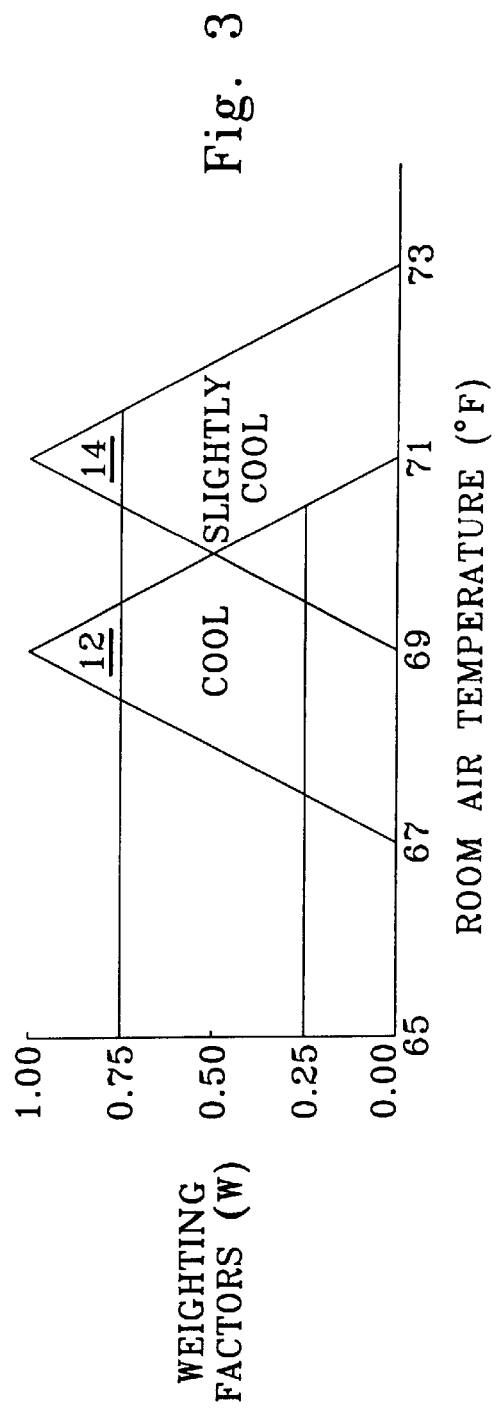
FIG. 3 shows an intersection of two fuzzy sets.

The weighing factor for each fuzzy set represents a percentage of user's responding. By manner of illustration, FIG. 3 depicts a situation where 75% of the user's felt slightly cool, and the remaining 25% felt cool. Hence, the respective weights of the cool 12 and slightly cool 14 sets are 0.75 and 0.25. The fuzzy sets can be used to convert the user's subjective feedback into a crisp room air temperature value using a method hereinafter termed defuzzification. Several different methods of defuzzification are known. Two popular methods are the center of area method and the centroid method. Each of these methods will be understood from the following example.

According to the center of area method, the crisp room air temperature T* is given by equation 1:

$$T^* = \frac{\sum\limits_{1}^{n}(w_n Tc_n)}{\sum w_n} \quad (1)$$

where, $w_n$ is the weighting factor for set n, $Tc_n$ is the center temperature of set n, and n is the number of sets.

Thus, for the sets shown in FIG. 3, the value T* is $[(0.75 \cdot Tc_1)+(0.25 \cdot Tc_2)]/(0.75+0.25)$. As shown in FIG. 3, the $Tc_1$, the center temperature of the slightly cool set is 71 degrees and $Tc_2$, the center temperature of the cool set is 69 degrees and $Tc_2$. Thus, the value T* is $[(0.75 \cdot 71 = 53.25) + (0.25 \cdot 69 = 17.25)]/(1) = 70.5$ degrees.

According to the centroid method, an area is created by joining two truncated areas formed by the intersection of the weighting factor lines and the two triangles representing the two intersecting sets (cool and slightly cool). By manner of illustration, FIG. 4A depicts an area 24 created by joining the two truncated areas 12 and 14. The crisp room air temperature T* is given by the centroid of the area parallel to the y-axis. In this case, the expression for the room air temperature is given by equation 2:

$$T^* = (\int Tda)/A \quad (2)$$

The integral of the product of the temperature T and differential area da can be calculated by splitting the area under the curve into smaller areas comprising rectangles and right triangles. By manner of illustration, FIG. 4B shows the area under the curve of FIG. 4A broken into six sub-areas. Areas 1 and 4 are right triangles having a positive slope. The area A of a triangle is (base·height)/2. For a right triangle having a positive slope (Area 1 and Area 4) $\int Tda = bh^2/6$. For right triangle having a negative slope (Area 6), the value of the integral $\int Tda = bh^2/3$. Further, the area of the rectangular areas Area 2, 3 and 5 is (base·height), and the value of the integrals $\int Tda = bh^2$.

Accordingly, for the set shown in FIG. 4B, the value T* is 70.36° F. using the centroid method. Once the crisp value of the room air temperature T* is known, a simple rule can be developed to adjust the setpoint based on the temperature difference ($T_d$) between the perceived room air temperature ($T_{room}$) and the current setpoint ($T_{setpoint}$), $T_d = T_{room} - T_{setpoint}$. A linear rule relating the setpoint to the temperature difference ($T_d$) is shown, for example, in FIG. 5. Notably, the linear rule specifies slight changes in the thermostat setpoint in response to the temperature difference ($T_d$) to avoid overcompensating for a given temperature difference.

Figure 5:
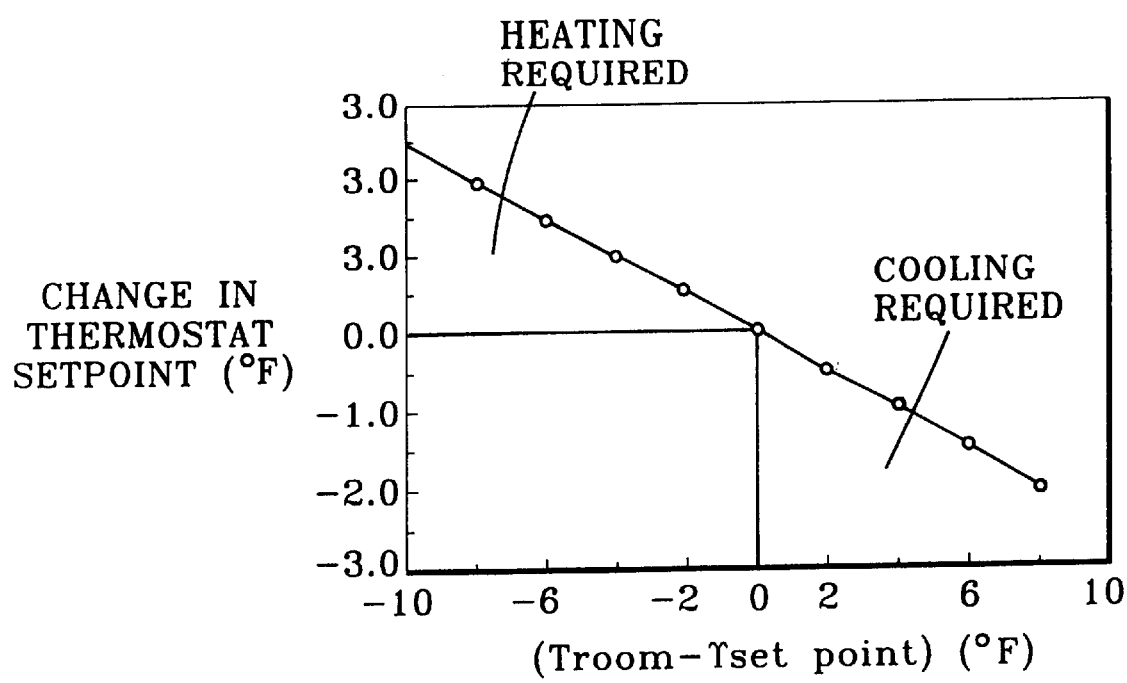
FIG. 5 is a graph showing a linear rule used to determine the new thermal setpoint according to a first embodiment.

Further, as shown in FIG. 5, there is an inverse correlation between the change in thermostat set point and the error between the room temperature and current thermostat set point. When the error is negative, i.e., the room temperature is lower than the set point, the change in thermostat set point is positive (provide heating). In contrast, when the error is positive i.e., the room temperature is warmer than the set point, the change in thermostat set point is negative (provide cooling).

Alternatively, fuzzy logic can be used in place of the linear rule. Specifically, a first collection of input fuzzy sets may be used to determine the weighting values of different sets describing the control action necessary to adjust the setpoint. An example of such fuzzy input sets is shown in FIG. 6A in which LN 30, MN 32, SN 34, ZE 36, SP 38, MP 40, LP 42 represent the spectrum from large positive adjustment to large negative adjustment to the thermostat.

The weighing factor(s) for a given temperature difference ($T_d$) may be directly determined using the above input sets LP 30–LN 42. Notably, FIG. 6A shows that any given temperature difference ($T_d$) is included within either one or two fuzzy sets.

By manner of illustration, FIG. 6A depicts a situation in which a temperature difference ($T_d$) is −5.8° F. which falls within the sets MN and SN. The weighing factors w1 and w2 are graphically determined in FIG. 6A by projecting the horizontal lines h1, and h2 from the intersection of vertical line v1 projected from the temperature difference ($T_d$). Thus, the sets MN and SN have respective weighing factors w1=0.8 and w2=0.2.

A fuzzy output set 50, shown in FIG. 6B, is determined using the weighting factors determined from the fuzzy input set (FIG. 6A). This set 50 may be used to calculate the crisp thermostat adjustment value using known defuzzification methods, such as the center of area or centroid methods which were discussed above with respect to FIGS. 3 and 4.

It should be appreciated that an inverse relationship exists between the fuzzy sets shown in FIGS. 6A and 6B. For example, the large negative (LN) set in FIG. 6A is represented by the large positive (LP) set in FIG. 6B, thereby providing a large positive change in thermostat set point (heating) in response to a large negative error between the actual room temperature and the thermostat set point shown in FIG. 6A. The overall process of calculating a new thermostat setpoint using fuzzy sets is shown, for example, in FIG. 7A.

Figure 7A:
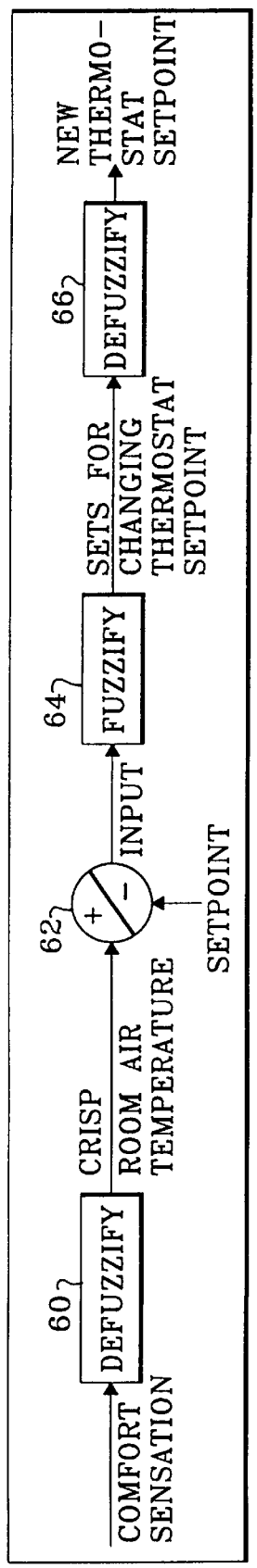
FIG. 7A is a flowchart of the steps used to determine the new thermal setpoint according to a first embodiment.

As shown in the flow chart of FIG. 7A, fuzzy comfort sensation from the individual occupants are collected as fuzzy sets 10–22 (FIG. 2) and defuzzified in a step 60 using the center of area or centroid approach, thereby yielding a crisp room air temperature. Then in step 62, the temperature difference ($T_d$) between the perceived room air temperature ($T_{room}$) and the current setpoint ($T_{setpoint}$) is calculated, $T_d = T_{room} - T_{setpoint}$. In step 64, the temperature difference $T_d$ is fuzzified using fuzzy sets 30–42 (FIG. 6A). Finally, in step 66 the setpoint information is defuzzified using a center of area or centroid approach.

Figure 7B:
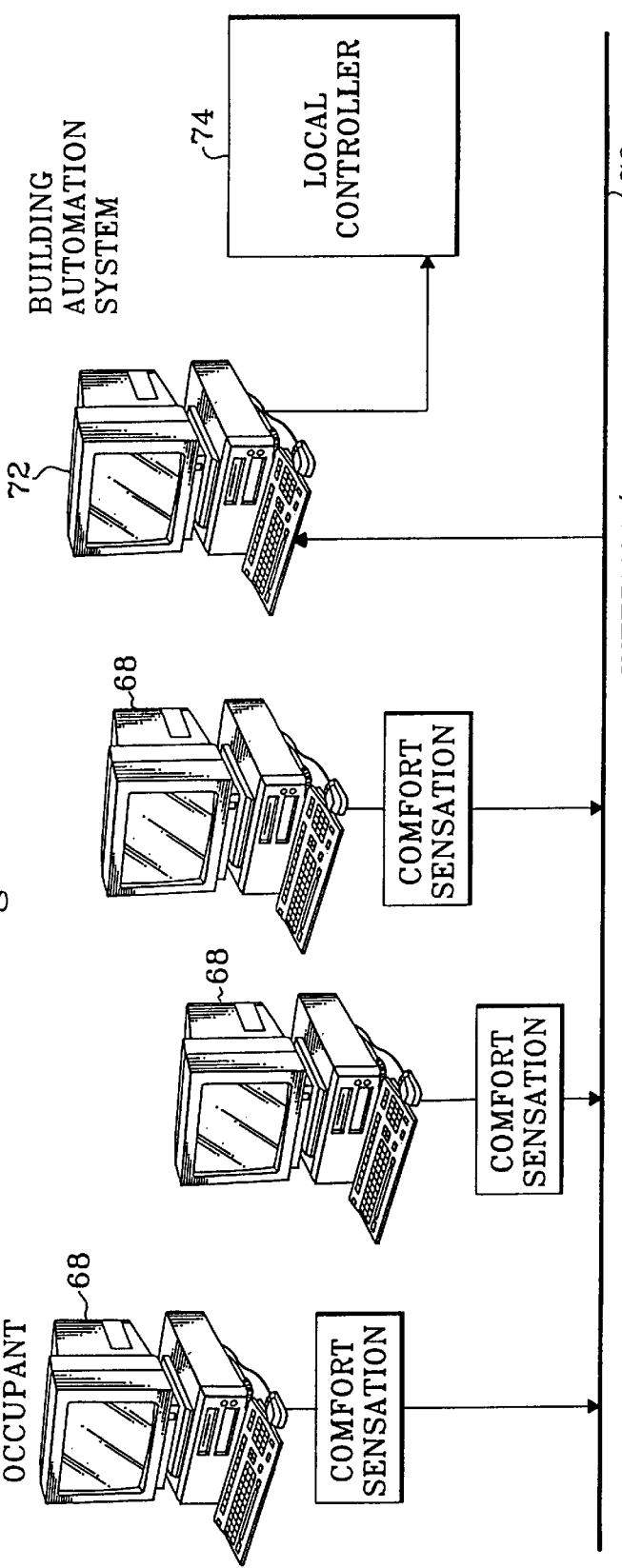
FIG. 7B is a diagram of the apparatus for adjusting a thermal setpoint using occupant feedback according to the present invention.

A preferred embodiment of the apparatus of the present invention will now be explained with reference to FIG. 7B.

The improved method for updating a thermal setpoint requires occupant feedback in determining the setpoint for a thermostat or a PMV sensor. According to the embodiment of FIG. 7B, occupants enter thermal comfort information using an interface 68 such as a personal computer, terminal or like input device. The information is then transmitted over the existing Internet and/or Intranet (such as Novell®) communications network 70 to a building automation system 72 which in turn communicates with the HVAC system (not shown) via a local controller 74. For example, building occupants may enter thermal comfort feedback into a web based interface reached via the Internet. A unique user identification code may be used to identify the occupant, the relevant area of the building, and the relevant thermostat(s). Alternatively, the occupant interface can reside on a server or host computer, with the data being transmitted over a LAN. The new setpoint value is calculated in the building automation system using one of the above described methods.

According to one embodiment of the present invention, the thermostat (not shown) is replaced by a thermal comfort sensor (not shown) such as a PMV sensor. PMV sensors utilize various environmental and user related factors to provide a more accurate reflection of thermal comfort than conventional thermostats. Specifically, PMV sensor output is based on the following six factors: dry bulb temperature, relative humidity, mean radiant temperature, air velocity, metabolic rate, and clothing insulation. PMV sensors output an index value which is related to the human sense of thermal comfort. For example, a PMV output of +3 means hot while a PMV of −3 indicates a cold condition.

ASHRAE (1978) has published a scale correlating the PMV scale directly to human comfort perception as follows:

| Numerical value in PMV scale | Sensation |
|---|---|
| +3 | Hot |
| +2 | Warm |
| +1 | Slightly warm |
| 0 | Neutral |
| −1 | Slightly cool |
| −2 | Cool |
| −3 | cold |

Berglund, Larry, "Mathematical Models for Predicting the Thermal Comfort Response of Building Occupants," *ASHRAE Transaction*, 1978, which is specifically incorporated by reference herein.

Figure 8:
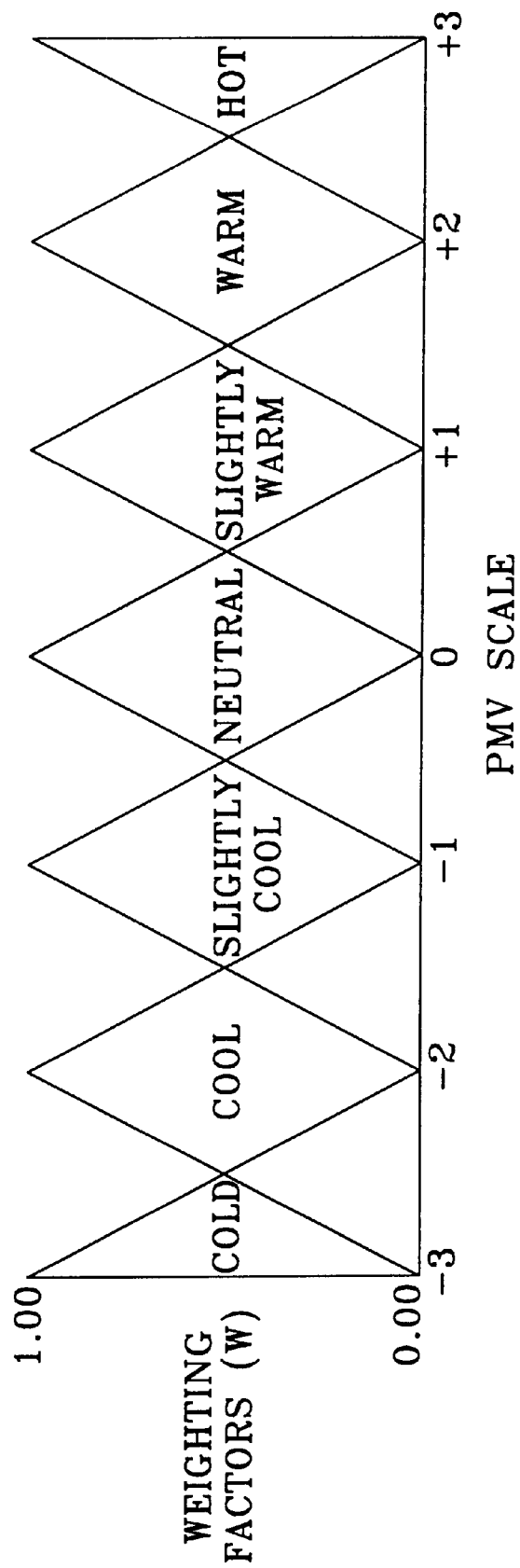
FIGS. 8 shows fuzzy sets used to calculate PMV according to a second embodiment of the present invention.

Currently, PMV sensors are prohibitively expensive (about $500–1000) relative to the $100 price of a thermostat). However, as the sensor technology improves, it is expected that PMV sensors will replace traditional thermostats for comfort control. Notably, the use of a PMV sensor may facilitate an improvement in thermal comfort over the method and apparatus of the first embodiment. A collection of fuzzy sets used for calculating the PMV value is shown, for example, in FIG. 8. The process of determining the PMV value and adjusting the PMV sensor setpoint is identical to the process described in relation to the first embodiment, except that in FIG. 8 the PMV scale value is utilized in place of the room air temperature used in FIG. 2.

A further improvement in comfort control may be achieved by using a more detailed tool describing the six input used to calculate the PMV values. Notably, ASHRAE has recently developed a tool to predict the PMV value along with other environment comfort indices (See, e.g., Fountain, M. E., and C. Huizenga., "A Thermal Sensation Prediction Tool for Use by the Profession," *ASHRAE Transaction*, 1997, Vol. 103, Part 2). However, the inputs utilized by such tools are difficult to obtain for individual occupants in conventional HVAC systems.

Figure 9:
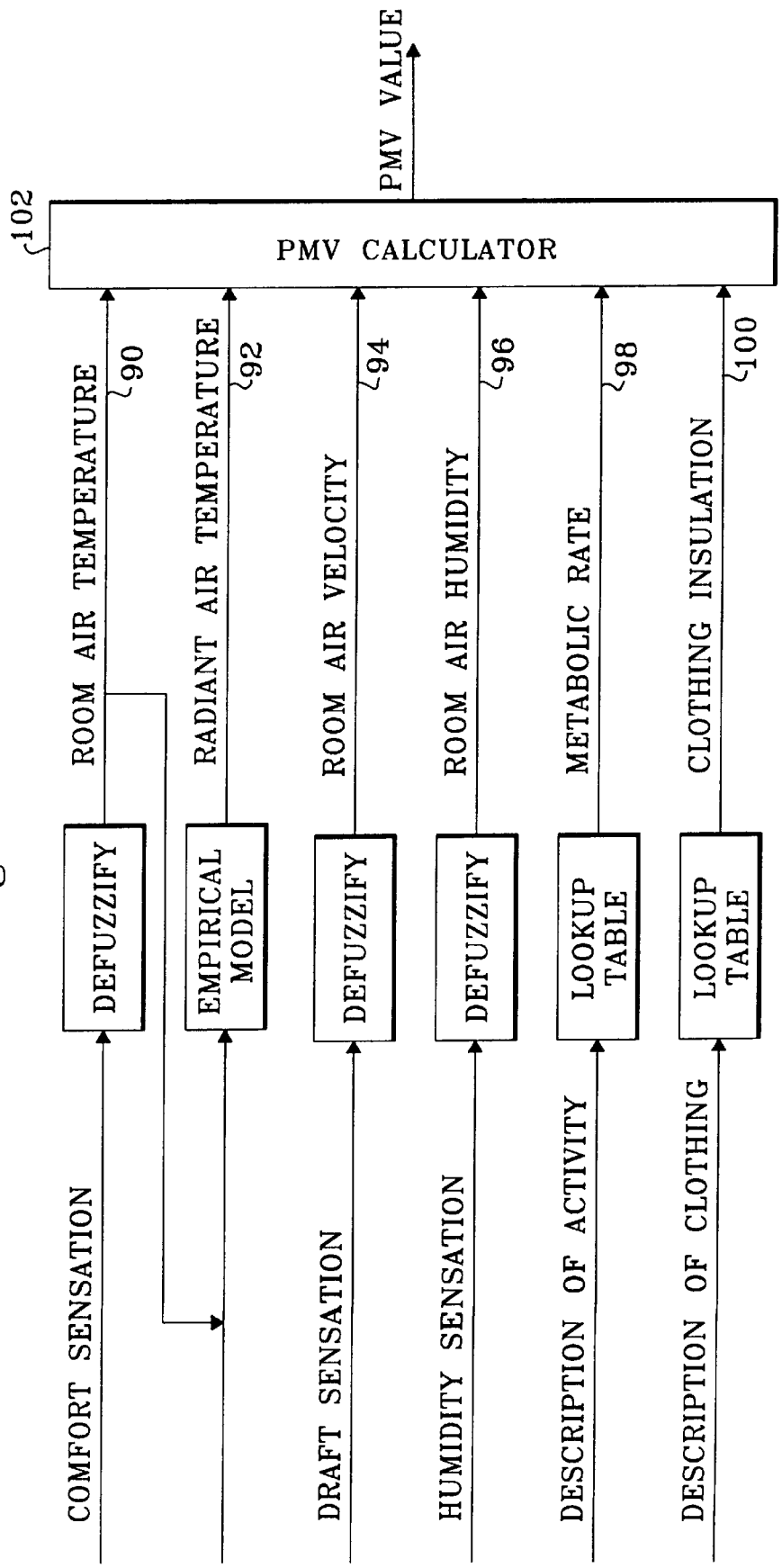
FIG. 9 is a schematic diagram of the process for calculating PMV.

In contrast, the feedback mechanism of the present invention facilitates occupant feedback. Occupant feedback regarding the various PMV inputs (fuzzy inputs) is collected using the system of FIG. 7B, and is used to determine the PMV setpoint. This aspect of the present invention is shown in the block diagram of FIG. 9, and is described as follows.

The PMV calculator 102 of the present invention utilizes the following six factors: comfort sensation (air temperature), radiant air temperature, draft sensation (air velocity), humidity, metabolic rate (occupant activity), and clothing insulation. Five of the factors (every factor except radiant air temperature) are obtained from the occupants via at least one of the Internet and the Intranet as described previously with respect to the first embodiment. The remaining factor, radiant air temperature, is determined from a look-up table using the calculated air temperature.

The first factor, room air temperature 90 is obtained by converting (defuzzifying) the subjective perceptions (fuzzy input) of individual occupants using one of the defuzzification methods previously described with respect to FIG. 2.

Figure 10A:
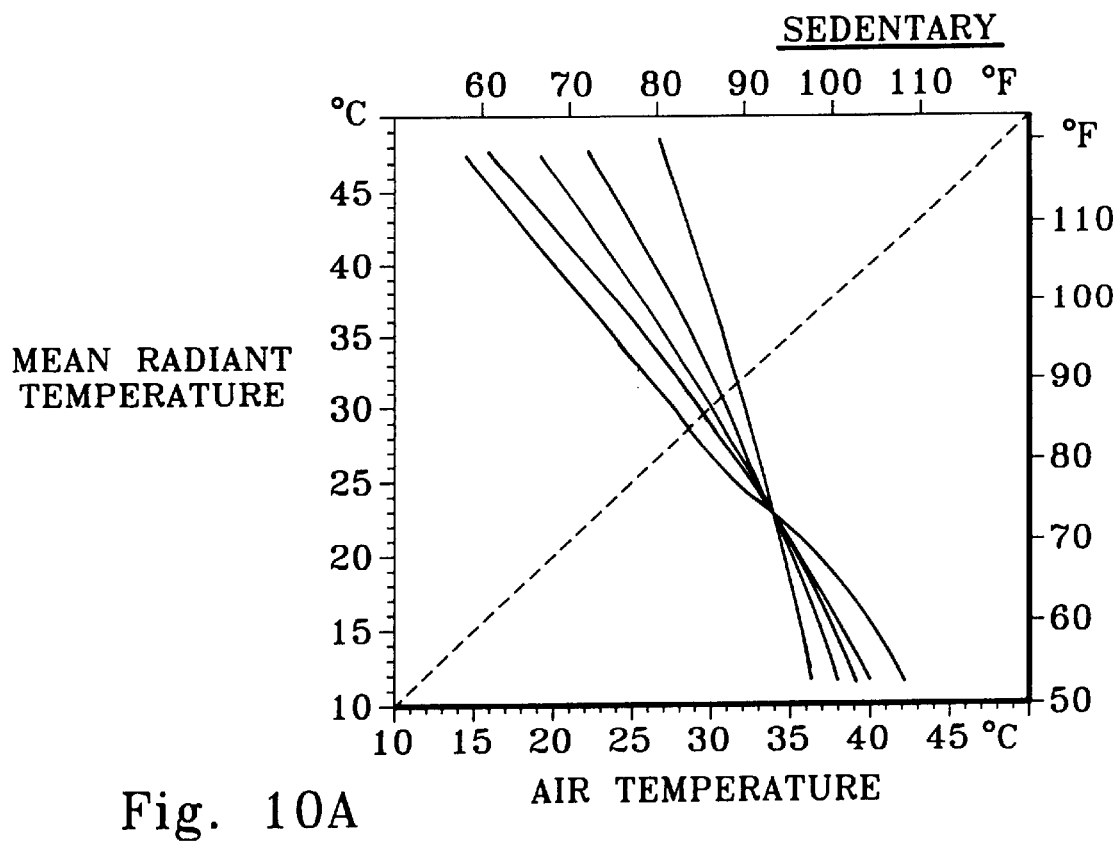
FIGS. 10A–10C are graphs correlating air temperature with radiant air temperature.
Figure 10B:
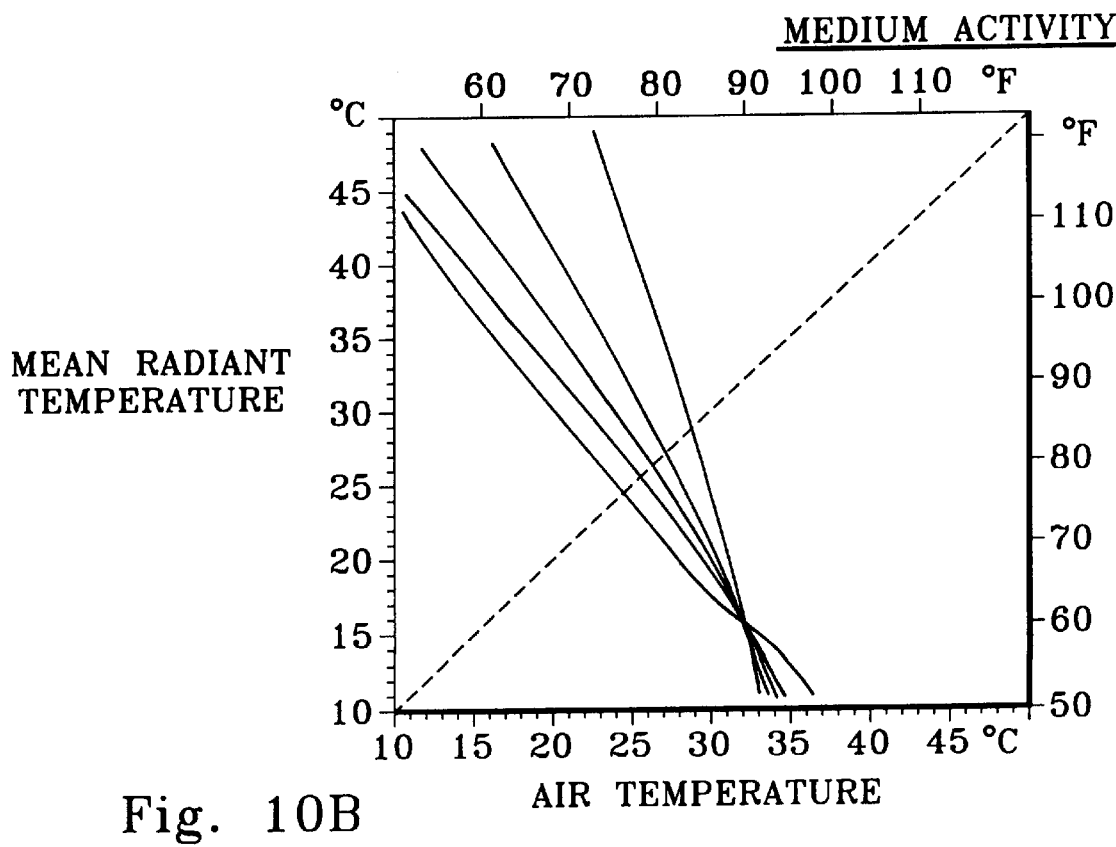
Figure 10C:
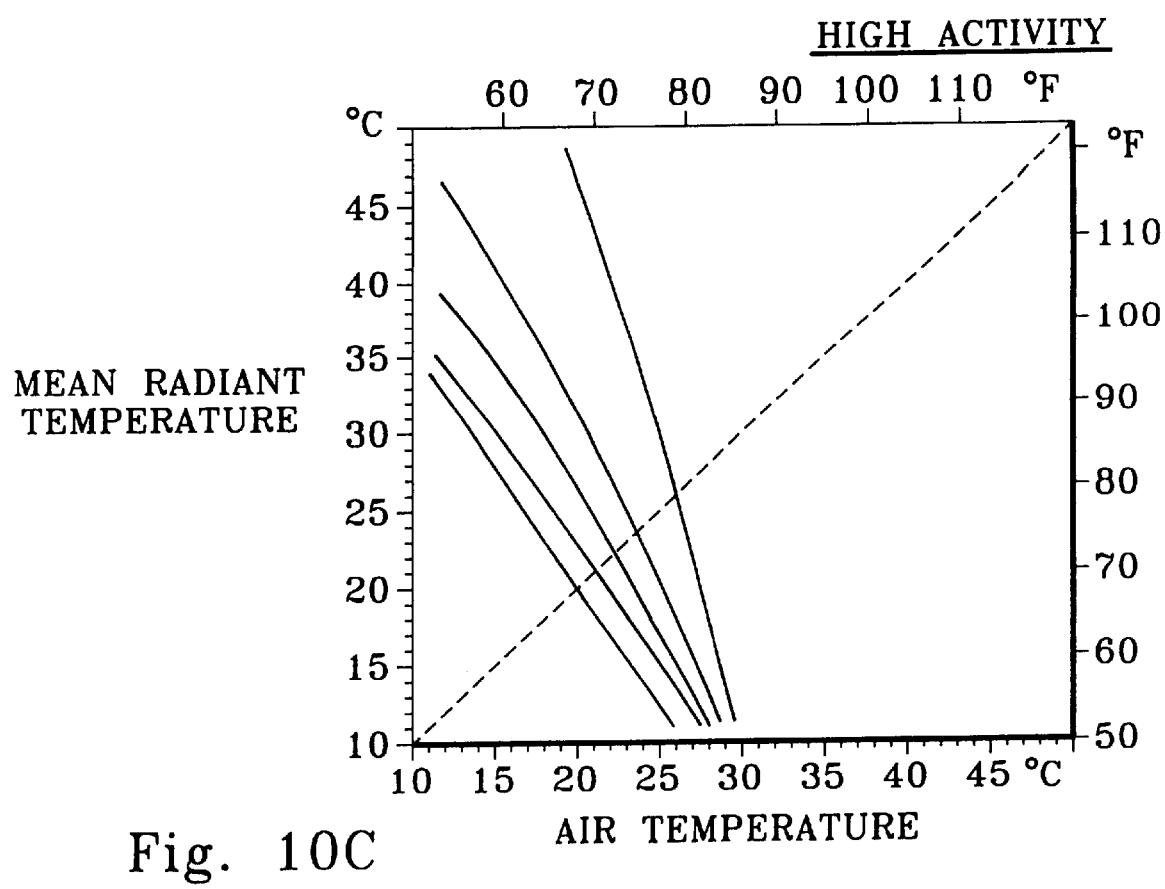

The second factor, radiant air temperature 92, can be correlated to the room air temperature using published data. By manner of illustration, FIGS. 10A–10C are graphs correlating room air temperature with radiant air temperature. See, e.g., Fanger, P.O., "*Calculation of thermal comfort: Introduction of a Basic Comfort Equation,*" *ASHRAE Transaction*, 1967).

Figure 11:
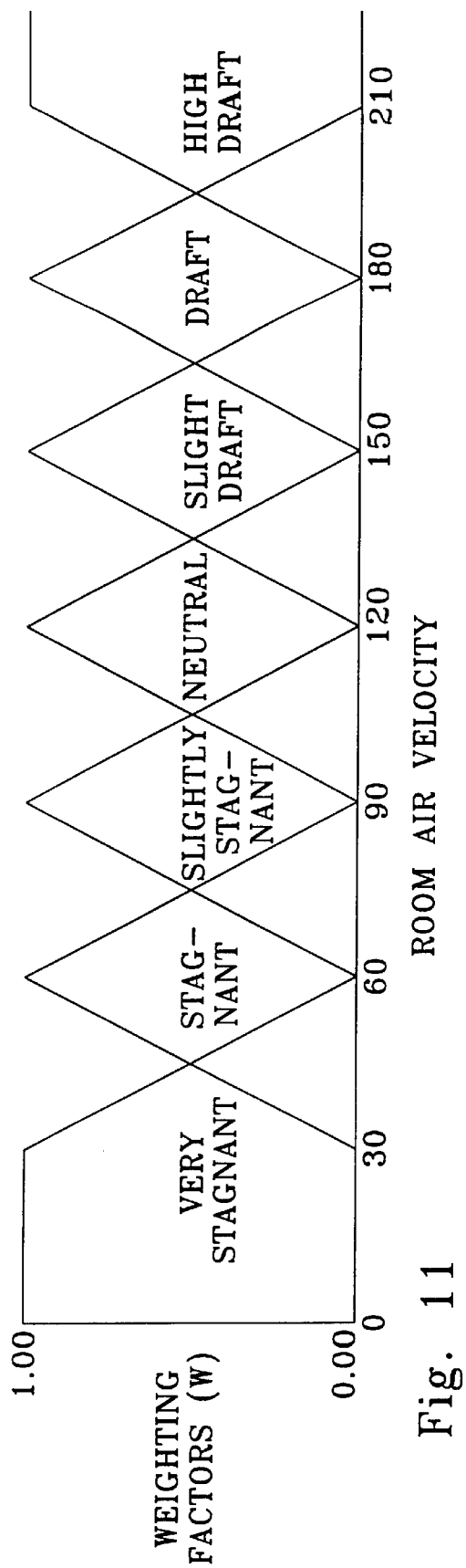
FIG. 11 shows fuzzy sets used to calculate air velocity according to the present invention.

The third and fourth factors, room air velocity 94 and room air humidity 96 sensation, can be determined by converting the subjective perceptions draft sensation and humidity sensation using fuzzy sets in the same manner as used in converting the thermal comfort sensation into room air temperature. Such fuzzy sets are shown, for example, in FIGS. 11 and 12.

Notably, the relationship between the draft sensation and the air velocity (FIG. 11) was developed using published experimental results (see, e.g., Fountain, M. E., and E. A. Arens., "Air Movement and Thermal Comfort," *ASHRAE Journal*, August, 1993, each of which is specifically incorporated by reference herein.). Likewise, the relationship, between humidity sensation and room air humidity (FIG. 12) is based on published research results (see, e.g., McArthur, J. W., "Humidity and Predicted-Mean-Vote-based (PMV-based) Comfort Control," *ASHRAE Transaction*, 1986, which is specifically incorporated by reference herein).

The fifth and sixth inputs are objective occupant data which can be converted into crisp inputs using look-up tables. Specifically, an occupant's metabolic rate 98 can be predicted from the occupant's description of activity, i.e., sitting, light work etc, using published tables. Table I shows the metabolic rate for different activity levels. Moreover, clothing insulation (expressed in the units of CLO) can also be predicted based on the occupant's description of clothing. See, e.g. Table II.

TABLE I

| Activity | Metabolic Rate Per Unit Body Surface Area $M/A_{Du}$ kcal/m²hr | Estimated Mechanical Efficiency $\eta$ | Estimated Relative Velocity in "Still" Air m/s | Correction Factor for Effecti Radiation Area $f_{eff}$ |
|---|---|---|---|---|
| Seated, quiet | 50 | 0 | 0 | 0.65 |
| Seated, drafting | 60 | 0 | 0–0.1 | 0.65 |
| Seated, typing | 70 | 0 | 0–0.1 | 0.65 |
| Standing at attention | 65 | 0 | 0 | 0.75 |
| Standing, washing dishes | 80 | 0–0.05 | 0–0.2 | 0.75 |
| Shoemaker | 100 | 0–0.10 | 0–0.2 | 0.65 |
| Sweeping a bare floor (38 strokes/min.) | 100 | 0–0.5 | 0.2–0.5 | 0.75 |
| Seated, heavy leg and arm movements (metal worker at a bench) | 110 | 0–0.15 | 0.1–0.3 | 0.65 |
| Walking about, moderate lifting or pushing (carpenter metalworker, industrial painter) | 140 | 0–0.10 | 0–0.9 | 0.75 |
| Pick and shovel work, stone mason work | 220 | 0–0.20 | 0–0.9 | 0.75 |

Walking on the level with Velocity: mph

| | | | | |
|---|---|---|---|---|
| 2.0 | 100 | 0 | 0.9 | 0.75 |
| 2.5 | 120 | 0 | 1.1 | 0.75 |
| 3.0 | 130 | 0 | 1.3 | 0.75 |
| 3.5 | 160 | 0 | 1.6 | 0.75 |
| 4.0 | 190 | 0 | 1.8 | 0.75 |
| 5.0 | 290 | 0 | 2.2 | 0.75 |

Walking up a grade:

| Grade | Velocity mph | | | | |
|---|---|---|---|---|---|
| 5 | 1 | 120 | 0.07 | 0.4 | 0.75 |
| 5 | 2 | 150 | 0.10 | 0.9 | 0.75 |
| 5 | 3 | 200 | 0.11 | 1.3 | 0.75 |
| 5 | 4 | 305 | 0.10 | 1.8 | 0.75 |
| 15 | 1 | 145 | 0.15 | 0.4 | 0.75 |
| 15 | 2 | 230 | 0.19 | 0.9 | 0.75 |
| 15 | 3 | 350 | 0.19 | 1.3 | 0.75 |
| 25 | 1 | 180 | 0.20 | 0.4 | 0.75 |
| 25 | 2 | 335 | 0.21 | 0.9 | 0.75 |

TABLE II

Typical Insulation and Permeability Values for Clothing Ensembles[a]

| Ensemble Description [b] | $I_{cl}$ (clo) | $I_l^c$ (clo) | $f_{cl}$ | $i_{cl}$ | $i_m^d$ |
|---|---|---|---|---|---|
| Walking shorts, short-sleeve shirt | 0.36 | 1.02 | 1.10 | 0.34 | 0.42 |
| Trousers, short-sleeve shirt | 0.57 | 1.20 | 1.15 | 0.36 | 0.43 |
| Trousers, long-sleeve shirt | 0.61 | 1.21 | 1.20 | 0.41 | 0.45 |
| Same as above, plus suit jacket | 0.96 | 1.54 | 1.23 | | |
| Same as above, plus vest and T-shirt | 1.14 | 1.69 | 1.32 | 0.32 | 0.37 |
| Trousers, long-sleeve shirt, long-sleeve sweater, T-shirt | 1.01 | 1.56 | 1.28 | | |
| Same as above, plus suit jacket and long underwear bottoms | 1.30 | 1.83 | 1.33 | | |
| Sweat pants, seat shirt | 0.74 | 1.35 | 1.19 | 0.41 | 0.45 |
| Long-sleeve pajama top, long pajama trousers, short ¾ sleeve robe, slippers (no socks) | 0.96 | 1.50 | 1.32 | 0.37 | 0.41 |
| Knee-length skirt, short-sleeve shirt, panty hose, sandals | 0.54 | 1.10 | 1.26 | | |
| Knee-length skirt, long-sleeve shirt, full slip, panty hose | 0.67 | 1.22 | 1.29 | | |
| Knee-length skirt, long-sleeve shirt, half slip, panty hose, long-sleeve sweater | 1.10 | 1.59 | 1.46 | | |
| Same as above, replace sweater with suit jacket | 1.04 | 1.60 | 1.30 | 0.35 | 0.40 |
| Ankle-length skirt, long-sleeve shirt, suit jacket, panty hose | 1.10 | 1.59 | 1.46 | | |
| Long-sleeve coveralls, T-shirt | 0.72 | 1.30 | 1.23 | | |
| Overalls, long-sleeve shirt, T-shirt | 0.89 | 1.46 | 1.27 | 0.35 | 0.40 |
| Insulated coveralls, long-sleeve thermal underwear, long underwear bottoms | 1.37 | 1.94 | 1.26 | 0.35 | 0.39 |

The PMV calculator uses the six crisp values to calculate the PMV value.

The time dependent PMV can be calculated as follows:

$$PMV = (0.352e^{-0.042(M/A_{DU})} + 0.032)\left[\frac{M}{A_{DU}}(1-\eta) - \right. \quad (3)$$

$$0.35\left(43 - 0.061\frac{M}{A_{DU}}(1-\eta) - P_a\right) - 0.42\left(\frac{M}{A_{DU}}(1-\eta) - 50\right) -$$

$$0.0023\frac{M}{A_{DU}}(44 - P_a) - 0.0014\frac{M}{A_{DU}}(34 - T_a) -$$

$$3.4 \cdot 10^{-8} f_{cl}((T_{cl} + 273)^4 - (T_{mrt} + 273)^4) - f_{cl}h_c(T_{cl} - T_a)$$

where $T_{cl}$ is given by:

$$T_{cl} = 35.7 - 0.032\frac{M}{A_{DU}}(1-\eta) - 0.18 I_{cl}[3.4 \times 10^{-8} \quad (4)$$

$$f_{cl}((T_{cl} + 273)^4 - (T_{mrt} + 273)^4) + f_{cl}h_c(T_{cl} - T_a)]$$

and $h_c$ is given by:

$$h_c = \{2.05(T_{cl} - T_a)^{0.25} \text{ for } 2.05(T_{cl} - T_a)^{0.25} > \quad (5)$$

$$10.4\sqrt{\overline{v}} \text{ for } 2.05(T_{cl} - T_a)^{0.25}$$

Figure 12:
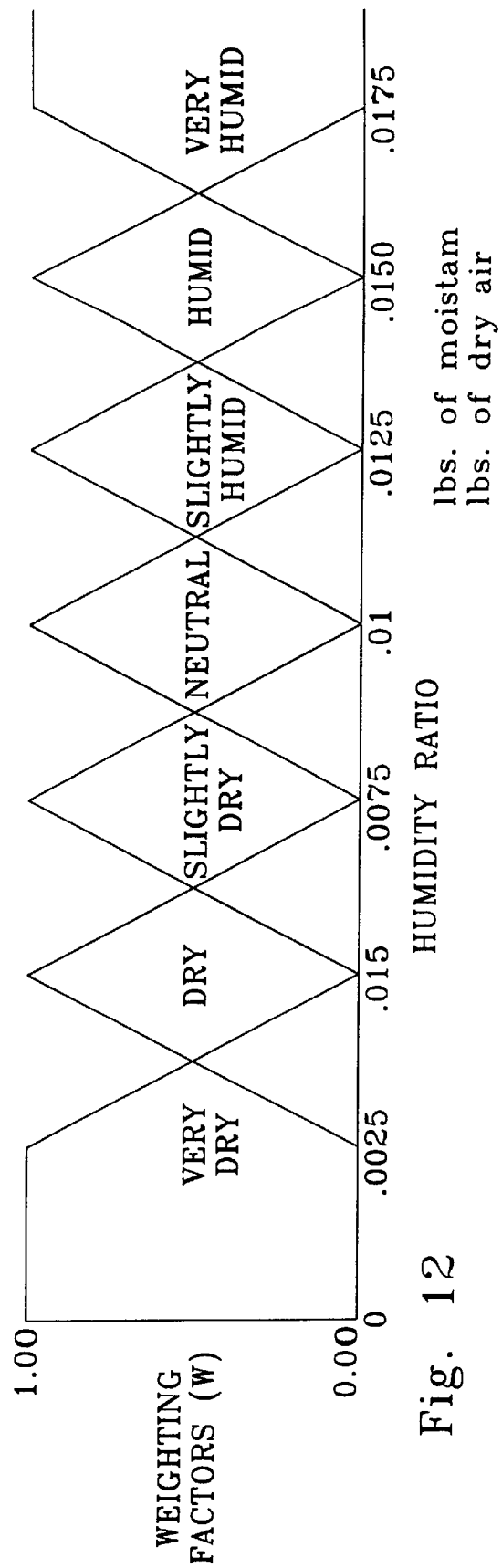
FIG. 12 shows fuzzy sets used to calculate humidity according to the present invention.

In the above equations, the values of $I_{cl}$ and $f_{cl}$ can be calculated from a lookup table (Table II). $M/A_{DU}$ and $\eta$ can be determined from a lookup table (Table I), and Ta and V are determined from defuzzified inputs (FIGS. 2 and 12, respectively). $T_{mrt}$ can be calculated from an empirical relationship between $T_{mrt}$ and room air temperature, type of activity and relative air velocity as shown in FIGS. 10A, 10B and 10C. Finally, Pa can be calculated by solving the following three equations simultaneously:

$$w = 0.62198[P_w/(P-P_w)] \quad (6)$$

$$v = [R_a T(1 + 1.6078W)]/P \quad (7)$$

$$P = P_w + P_a \quad (8)$$

where, v is the room volume expressed in cubic feet w is the humidity ratio obtained from defuzzification of user input (FIG. 12)

T is the air temperature obtained from defuzzification of user input (FIG. 2)

$P_w$ is the partial vapor pressure

P is the total pressure $P_a$ is the partial air pressure $R_a$ is the universal gas constant 1545.32 ft-1bf./(1b.-Mole-° R)

TABLE III

Typical Metabolic Heat Generation for Various Activities

| | Btu/(h · ft²) | met[a] |
|---|---|---|
| Resting | | |
| Sleeping | 13 | 0.7 |
| Reclining | 15 | 0.8 |
| Seated, quiet | 18 | 1.0 |
| Standing, relaxed | 22 | 1.2 |

TABLE III-continued

Typical Metabolic Heat Generation for Various Activities

| | Btu/(h · ft²) | met[a] |
|---|---|---|
| Walking (on level surface) | | |
| 2.9 ft/s (2 mph) | 37 | 2.0 |
| 4.4 ft/s (3 mph) | 48 | 2.6 |
| 5.9 ft/s (4 mph) | 70 | 3.8 |
| Office Activities | | |
| Reading, seated | 18 | 1.0 |
| Writing | 18 | 1.0 |
| Typing | 20 | 1.1 |
| Filing, seated | 22 | 1.2 |
| Filing, standing | 26 | 1.4 |
| Walking about | 31 | 1.7 |
| Lifting/packing | 39 | 2.1 |
| Driving/Flying | | |
| Car | 18 to 37 | 1.0 to 2.0 |
| Aircraft, routine | 22 | 1.2 |
| Aircraft, instrument landing | 33 | 1.8 |
| Aircraft, combat | 44 | 2.4 |
| Heavy vehicle | 59 | 3.2 |
| Miscellaneous Occupational Activities | | |
| Cooking | 29 to 37 | 1.6 to 2.0 |
| Housecleaning | 37 to 63 | 2.0 to 3.4 |
| Seated heavy limb movement | 41 | 2.2 |
| Machine work | | |
| sawing (table saw) | 33 | 1.8 |
| light (electrical industry) | 37 to 44 | 2.0 to 2.4 |
| heavy | 74 | 4.0 |
| Handling 110 lb bags | 74 | 4.0 |
| Pick and shovel work | 74 to 88 | 4.0 to 4.8 |
| Miscellaneous Leisure Activities | | |
| Dancing, social | 44 to 81 | 2.4 to 4.4 |
| Calisthenics/exercise | 55 to 74 | 3.0 to 4.0 |
| Tennis, singles | 66 to 74 | 3.6 to 4.0 |
| Basketball | 90 to 140 | 5.0 to 7.6 |
| Wrestling, competitive | 130 to 160 | 7.0 to 8.7 |

According to a third embodiment of the present invention, an adaptation algorithm (neural network) may be used to predict the thermal setpoint (or PMV value) using historical data. Specifically, a relationship is developed between historical thermal (or PMV) setpoint information and associated identification such as outside air temperature, outside air humidity, day of the week and the time of the day. According to a preferred embodiment, the historical thermal (or PMV) setpoint data is determined using occupant feedback according to the first or second embodiments of the present invention. The historical data is used to establish a relationship between the thermal (or PMV) setpoint and other input variables that influence the setpoint. Once the relationship is established, the thermal (or PMV) setpoints can be predicted in real-time using the prevailing conditions (outside air temperature, outside air humidity, day of the week and the time of the day).

Figure 13:
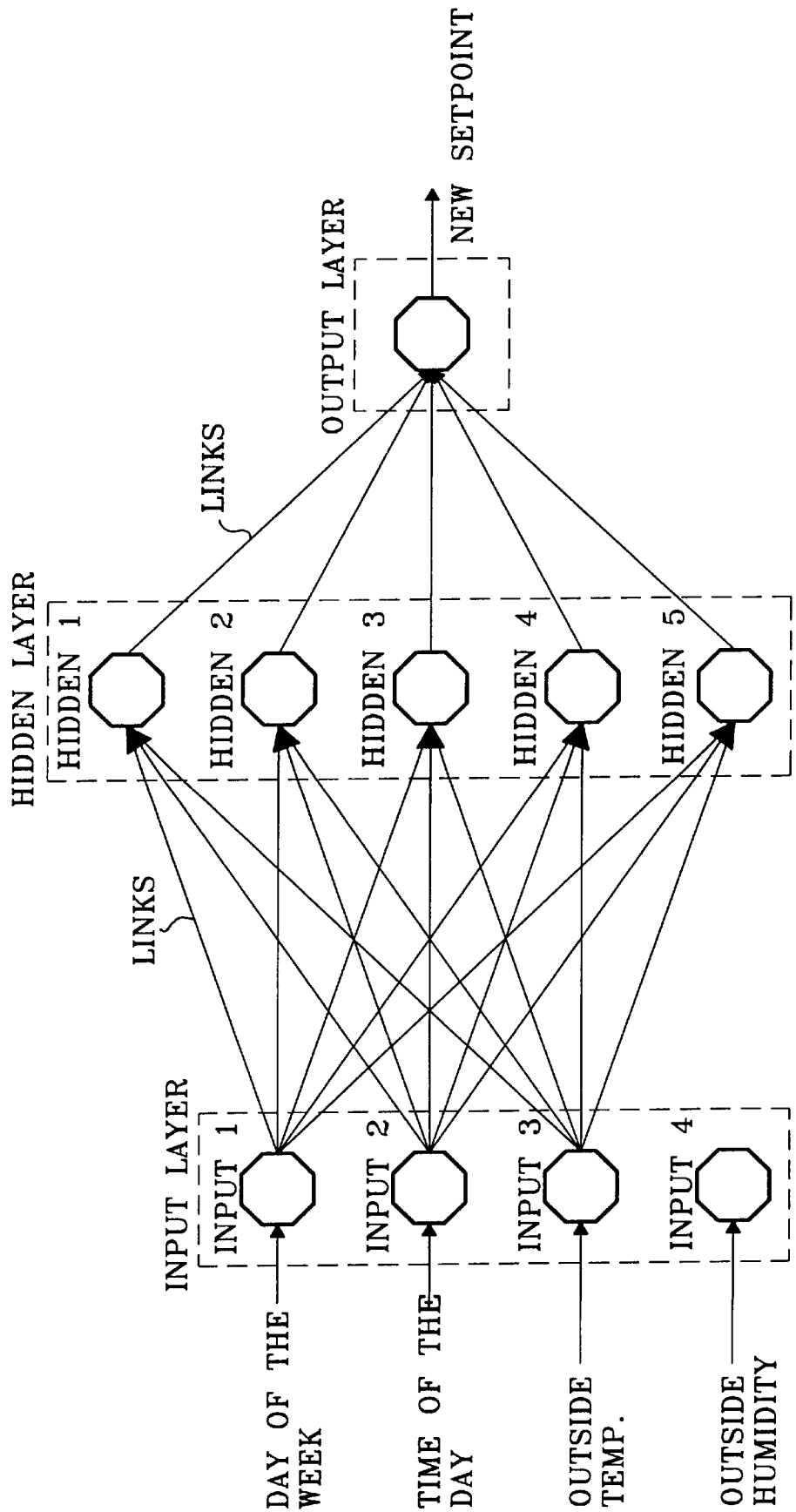
FIG. 13 is a schematic view of an artificial neural network according to a third embodiment of the present invention.

The aforementioned relationship may be determined using an artificial neural network (ANN). A schematic of an ANN is shown in FIG. 13.

According to a preferred embodiment embodiment of the present invention the neural net is a general regression neural network (GRNN) which captures the input-output regression (linear or nonlinear) characteristics of the system. The General Regression Neural Network (GRNN) is chosen to replicate the relationship between the setpoint and other input variables due to its simplicity, robustness and excellent capability in system identification. Unlike a conventional neural network, it requires minimal computational time to effectively capture the system characteristics. Notably, this type of neural network requires only a single parameter ($\sigma$), and unlike back propagation, does not involve any iterative training process. The following is a brief account of GRNN that illustrates its implementation in identification of the HVAC components.

The input to a GRNN is a series of data that can have multiple dimensions. For sample values of $X_i$ and $Y_i$ of input vector X and scalar output Y, an estimate of the desired value of Y at any given value of X is found using all of the sample values using the following equation:

$$\hat{Y}(X) = \frac{\sum_{i=1}^{n} Y_i \exp\left(-\frac{D_i^2}{2\sigma^2}\right)}{\sum_{i=1}^{n} \exp\left(-\frac{D_i^2}{2\sigma^2}\right)} \quad (9)$$

where $\sigma$ is the single smoothing parameter of the GRNN, and the scalar function $D_i^2$, representing the Euclidean distance from the given value to the known points, is given by $$D_i^2 = (X - X_i)^T (X - X_i) \quad (10)$$

Equations 6 and 7 are the essence of the GRNN method. For a small value of the smoothing parameter, $\sigma$, the estimated density assumes non-Gaussian shapes but with the chance that the estimate may vary widely between the known irregular points. When $\sigma$ is large, a very smooth regression surface is achieved. The estimate $\hat{Y}(X)$ is a weighted average of all the observed samples, $Y_i$, where each sample is weighted exponentially according to its Euclidean distance from each $X_i$ denoted by $D_i$.

Figure 14:
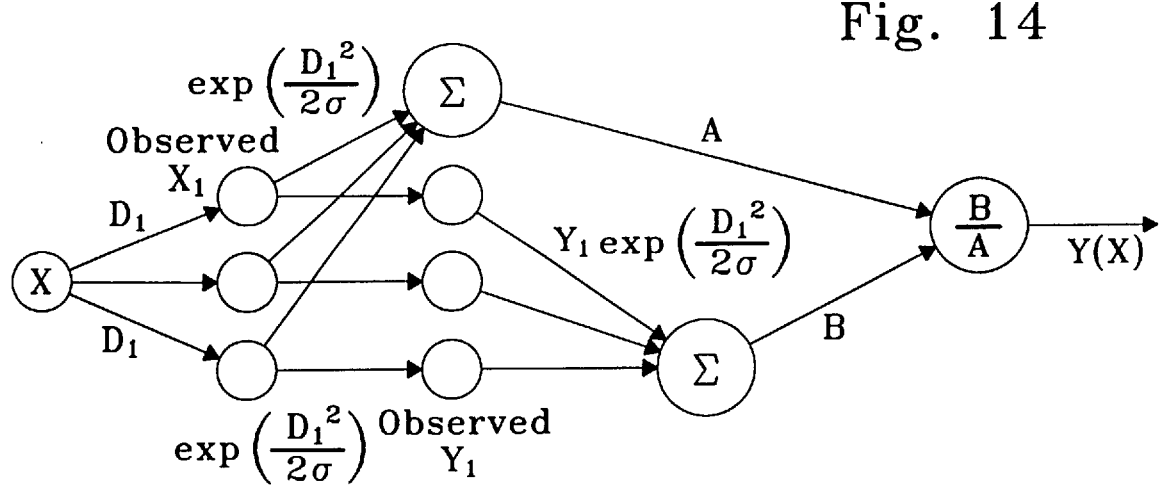
FIG. 14 shows the general regression neural network architecture according to the third embodiment of the present invention.

By manner of illustration, FIG. 14, shows the neural network architecture for the above described GRNN algorithm. For a given X, the connections between the input and the first layers compute the scalar $D_i$, based on observed samples $X_i$ and smoothing parameter $\sigma$, and then takes the exponent of $D_i^2$.

A node in the second layer sums the exponential values for all samples. The other nodes calculate the product of the exponential value and the corresponding observed output $Y_i$ for each sample observation. A node in the third layer sums the product values. In turn, the sum is supplied to the output node where the ratio between the sum of the exponent and the product values is calculated.

The weighting coefficients between the layers are dependent only upon the observed samples of $X_i$, $Y_i$ and smoothing parameter $\sigma$. As a result, only a suitable single value of $\sigma$ is needed to predict the output. The value of $\sigma$ can be calculated using a simple yet effective scheme known as the "Holdout" method (Spect 1991), which is specifically incorporated by reference herein. Holdout is one of several methods which are available to find an optimum value of the smoothing parameter, $\sigma$.

The implementation of GRNN also offers advantages over the conventional methods of identification. In a traditional regression method for identification, the operator has to input a priori knowledge of the equation type or has to search for the best fit equation exhaustively. The code requirement for a non-linear regression is intensive and may be prohibitive for on-line use in a controller. In contrast, the GRNN does not require any user input for the functional form of the characteristics and uses a strikingly simple code. Moreover, the GRNN algorithm can be imbedded into a hardware processor, thereby simplifying the software development process since software coding during field installation is not necessary. The choice of sample size and specific sample values are important in designing a GRNN in general.

An improved method for updating a thermal setpoint in an HVAC system according to the present invention has been shown and described. According to a first aspect of the present invention, occupant feedback is used in determining the setpoint for a thermostat or a PMV sensor. Moreover, according to a second aspect of the present invention, a setpoint is predicted using an adaptation algorithm developed using historical data.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for adjusting a thermostat setpoint for controlling the temperature of a space controlled by an HVAC system using feedback information provided by individual occupants located in the space, comprising the steps of:
    (a) transmitting feedback information from plural occupants to a CPU over at least one of an Internet and Intranet communications network;
    (b) calculating an average feedback temperature value; and
    (c) adjusting the thermostat setpoint based on said calculated average value.

2. A method for calculating a new thermal setpoint for controlling the temperature of a space controlled by an HVAC system using the existing thermal setpoint and subjective thermal comfort (fuzzy) feedback information provided by one or more individual occupants, comprising:
    (a) transmitting thermal comfort (fuzzy) feedback from plural occupants to a CPU over at least one of an Internet and Intranet communications network, wherein said thermal comfort feedback is selected from a predetermined number of thermal comfort perception sets (fuzzy sets), each said thermal comfort perception set being assigned a predetermined value;
    (b) converting the thermal comfort (fuzzy) feedback received from occupants of a given heating/cooling zone into a numerical (crisp) room air temperature value T* using a defuzzification process wherein said crisp room air temperature value T* is determined as a weighted average of the thermal comfort feedback; and
    (c) calculating the new thermal setpoint using a temperature difference ($T_d$) between the crisp room air temperature T* and the existing thermal setpoint.

3. The method according to claim 2, wherein in step (b) the crisp room air temperature value T* is calculated using a center of area approach $$T^* = \Sigma(w_n Tc_n)/\Sigma w_n$$

where each occupant's thermal comfort feedback is expressed as one of a predefined number of fuzzy sets, $Tc_n$ is a predetermined center temperature for set n, $w_n$ is the weighing factor corresponding to a percentage of feedback for set n, and n is the number of fuzzy sets.

4. The method according to claim 2, wherein in step (b) the crisp room air temperature value T* is calculated by determining a centroid approach wherein $T^*=(\int Tda)/A$, where each occupant's thermal comfort feedback is expressed as one of a predefined number of fuzzy sets, each set having a predetermined temperature range which overlaps with an adjacent set, where A represents a sum of areas of the pre defined number of sets, the area of each set being truncated in relation to a percentage of feedback, and $\int Tda$ represents the integral of the product of the temperature T and differential area da of the truncated sets.

5. The method according to claim 2, wherein in step (c) the new thermal setpoint is determined from the temperature difference ($T_d$) using a linear rule.

6. The method according to claim 2, wherein in step (c) the new thermal setpoint (TS) is determined from the temperature difference ($T_d$) using fuzzy logic approach, comprising the steps of:

(c-1) reading at least one weighing factor ($w_n$) from a look-up table using the temperature difference ($T_d$);

(c-2) calculating a thermal setpoint (TS) using one of a center of area approach and a centroid approach, wherein:

the center of area approach is determined: $TS=\Sigma(w_n Td_n)/\Sigma w_n$, and the centroid approach is determined: $TS=(\int T_d da)/A$, where each occupant's thermal comfort feedback is expressed as one of a predefined number of sets, each set having a predetermined temperature range which overlaps with an adjacent set, where A represents a sum of areas of the predefined number of sets, the area of each set being truncated in relation weighing factor $w_n$ corresponding to a percentage of occupant feedback set n, $\int Tda$ representing the integral of the product of the temperature T and differential area da of the truncated sets, $Td_n$ is a predetermined center temperature of set n, and n is the number of fuzzy sets.

7. A method for calculating a new thermal setpoint for a PMV sensor controlling the thermal comfort of a space in an HVAC system using the existing thermal setpoint and subjective (fuzzy) feedback information, comprising:

(a) receiving feedback information including fuzzy feedback information over at least one of an Internet and Intranet communications network, wherein said fuzzy feedback includes thermal comfort perception selected from a predetermined number of thermal comfort perception sets (fuzzy sets), each said thermal comfort perception set being assigned a predetermined value;

(b) converting the fuzzy feedback received from occupants of a given heating/cooling zone into crisp numerical values, including room air temperature value T*, using a defuzzification process wherein said crisp values are determined as a weighted average of the fuzzy feedback; and (c) calculating a PMV setpoint value for the PMV sensor using the crisp values.

8. The method according to claim 7, further wherein the feedback information includes items of information selected from the group consisting of (thermal comfort sensation, draft sensation, humidity sensation, description of occupant activity, and description of clothing), and in step (c) the defuzzification process uses at least one of a lookup table, center of area approach and centroid approach.

9. A control system for adjusting a thermostat setpoint for controlling the temperature of a space controlled by an HVAC system using occupant feedback comprising:

a software interface for entering occupant feedback;

means for transmitting the occupant feedback;

a CPU for receiving feedback information from said transmitting means, wherein said CPU calculates an adjusted thermostat setpoint using a previous thermostat setpoint and the occupant feedback information.

10. The control system of claim 9, wherein said transmitting means includes at least one of an Internet and Intranet communications network.

11. The control system of claim 10, wherein said software interface is a web page on the Internet, and the occupant feedback includes thermal comfort information.

12. A control system for adjusting a PMV sensor setpoint for controlling the temperature of a space controlled by an HVAC system using occupant feedback comprising:

a software interface for entering occupant feedback;

means for transmitting the occupant feedback;

a CPU for receiving feedback information from said transmitting means, wherein said CPU calculates an adjusted PMV setpoint using a previous PMV setpoint and the occupant feedback information.

13. The control system of claim 12, wherein said transmitting means includes at least one of an Internet and Intranet communications network.

14. The control system of claim 13, wherein said software interface is a web based interface on the Internet, and the occupant feedback includes thermal comfort information.

15. An adaptive method for predicting a setpoint for controlling the temperature of a space controlled by an HVAC system using historical data, comprising the steps:

(a) compiling historical data including setpoint data and identification data identifying prevailing characteristics when said setpoint data was determined, wherein said setpoint data includes at least one of thermal setpoint and PMV setpoint data, and said identification data includes time of day, day of week, outside air temperature, and outside humidity;

(b) determining a regression relationship between each said item of setpoint data and its associated identification information using regression analysis; and (c) predicting a thermal setpoint in real-time using said regression relationship based on input information including time of day, day of week, outside air temperature, and outside humidity.

16. The adaptive method according to claim 15, wherein said regression relationship in step (b) is determined using a general regression neural network.

17. The adaptive method according to claim 15, wherein the historical setpoint data was determined using fuzzy feedback received from occupants of a given heating/cooling zone.

* * * * *